United States Patent
Saberidokht et al.

(10) Patent No.: US 11,675,881 B2
(45) Date of Patent: Jun. 13, 2023

(54) COMPUTER-BASED SYSTEMS CONFIGURED FOR AUTOMATED COMPUTER SCRIPT ANALYSIS AND MALWARE DETECTION AND METHODS THEREOF

(71) Applicant: Capital One Services, LLC, McLean, VA (US)

(72) Inventors: Baharak Saberidokht, McLean, VA (US); Farshid Marbouti, McLean, VA (US); Stephen Fletcher, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/960,375

(22) Filed: Oct. 5, 2022

(65) Prior Publication Data
US 2023/0046532 A1    Feb. 16, 2023

Related U.S. Application Data

(63) Continuation of application No. 17/088,368, filed on Nov. 3, 2020, now Pat. No. 11,481,475.

(51) Int. Cl.
*G06F 21/00* (2013.01)
*G06F 21/14* (2013.01)
(Continued)

(52) U.S. Cl.
CPC .............. *G06F 21/14* (2013.01); *G06F 9/544* (2013.01); *G06F 18/214* (2023.01); *G06F 21/54* (2013.01); *G06F 21/84* (2013.01); *G06N 20/20* (2019.01)

(58) Field of Classification Search
None
See application file for complete search history.

(56) References Cited

U.S. PATENT DOCUMENTS

| 8,112,484 | B1 | 2/2012 | Sharma et al. |
| 9,521,164 | B1 * | 12/2016 | Angiolelli ........... H04L 63/1483 |
| 10,257,212 | B2 | 4/2019 | Antonakakis et al. |
| 11,146,580 | B2 * | 10/2021 | Boros ................. H04L 63/1416 |
| 11,481,475 | B2 * | 10/2022 | Saberidokht .......... G06F 21/554 |

(Continued)

OTHER PUBLICATIONS

International Search Report and Written Opinion from International Application No. PCT/US2021/057897 dated Feb. 2, 2022.
(Continued)

*Primary Examiner* — Jeffery L Williams
(74) *Attorney, Agent, or Firm* — Greenberg Traurig, LLP

(57) ABSTRACT

Systems and methods enable automated and scalable obfuscation detection in programming scripts, including processing devices that receive software programming scripts and a symbol set. The processing devices determine a frequency of each symbol and an average frequency of the symbols in the script text. The processing devices determine a normal score of each symbol based on the frequency of each symbol and the average frequency to create a symbol feature for each symbol including the normal score. The processing devices utilize an obfuscation machine learning model including a classifier for binary obfuscation classification to detect obfuscation in the script based on the symbol features. The processing devices cause to display an alert indicting an obfuscated software programming script on a screen of a computing device associated with an administrative user to recommend security analysis of the software programming script based on the binary obfuscation classification.

20 Claims, 8 Drawing Sheets

(51) Int. Cl.
    *G06F 21/84*     (2013.01)
    *G06N 20/20*     (2019.01)
    *G06F 9/54*     (2006.01)
    *G06F 21/54*     (2013.01)
    *G06F 18/214*     (2023.01)

(56) References Cited

U.S. PATENT DOCUMENTS

| | | |
|---|---|---|
| 2004/0015863 A1 | 1/2004 | McBrearty et al. |
| 2010/0024033 A1 | 1/2010 | Kang et al. |
| 2012/0079596 A1 | 3/2012 | Thomas et al. |
| 2013/0124984 A1 | 5/2013 | Kuspa |
| 2013/0139261 A1 | 5/2013 | Friedrichs et al. |
| 2014/0090061 A1 | 3/2014 | Avasarala et al. |
| 2018/0012142 A1 | 1/2018 | Pistoia et al. |
| 2019/0199736 A1 | 6/2019 | Howard et al. |
| 2020/0050760 A1 | 2/2020 | El-Moussa et al. |
| 2020/0293655 A1 | 9/2020 | Long et al. |
| 2020/0412740 A1 | 12/2020 | Goutal et al. |
| 2022/0138288 A1 | 5/2022 | Saberidokht et al. |

OTHER PUBLICATIONS

De Andrade et al., "Malware automatic analysis," 2013 BRICS Congress on Computational Intelligence and 11th Brazilian Congress on Computational Intelligence, IEEE, 2013, Sep. 8, 2013 <<https://ieeexplore.ieee.org/abstract/document/6855928>> retrieved Jan. 7, 2004.

Kolter et al. 2006. Learning to Detect and Classify Malicious Executables in the Wild. J. Mach. Learn. Res. 7 (Jan. 12, 2006), 2721-2744. (Year: 2006).

Vinod et al., Scattered Feature Space for Malware Analysis, in Advances in Computing and Communications. ACC 2011. Communications in Computer and Information Science, vol. 190. Springer, Berlin, Heidelberg. (Year: 2011).

Kruegel et al., Polymorphic Worm Detection Using Structural Information of Executables. In: Valdes, A., Zamboni, D. (eds) Recent Advances in Intrusion Detection. RAID 2005. Lecture Notes in Computer Science, vol. 3858. Springer, Berlin, Heidelberg. (Year: 2005).

* cited by examiner

COMPUTER-BASED SYSTEMS CONFIGURED FOR AUTOMATED COMPUTER SCRIPT ANALYSIS AND MALWARE DETECTION AND METHODS THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to improved computer-based systems configured for one or more novel technological applications of automated script analysis and malware detection and methods thereof.

BACKGROUND OF TECHNOLOGY

Many operating systems come bundled with a scripting runtime, such as Powershell™ which is bundled with nearly all versions of Microsoft Windows™. Scripting runtimes are heavily used in many major enterprises as part of managing both desktops and servers. Depending on the size of the organization, this can mean tens of millions of scripts get executed per month.

Script runtimes can also be a common avenue for introducing malware into a system or network due to its widespread availability and its difficulties in anti-virus coverage. Indeed, these scripts can be responsible for important and fundamental system functionalities such as system management, enterprise-wide updates and some which gather central processing unit (CPU) utilization and statistics of the system. Due to such broad usage, it can be very tedious and difficult for an analyst to go through every script to identify malicious scripts.

SUMMARY OF DESCRIBED SUBJECT MATTER

In some embodiments, the present disclosure provides an exemplary technically improved computer-based methods that includes at least the following steps of receiving, by at least one processor, a software programming script including script text; receiving, by the at least one processor, a symbol set including a plurality of symbols; identifying, by at least one processor, one or more symbols of the plurality of symbols in the script text; determining, by the at least one processor, a frequency of each symbol of the one or more symbols in the script text; determining, by the at least one processor, an average frequency of the one or more symbols in the script text; determining, by the at least one processor, a normal score of each symbol of the one or more symbols based at least in part on the frequency of each symbol and the average frequency; extracting, by the at least one processor, at least one symbol feature as the normal score of each symbol of the one or more symbols; utilizing, by the at least one processor, an obfuscation machine learning model including a classifier for binary obfuscation classification to predict that the software programming script is obfuscated based on the at least one symbol feature, where the binary obfuscation classification includes at least one predicted likelihood of obfuscation relative to at least one obfuscation threshold value; and causing to display, by the at least one processor, an alert indicting an obfuscated software programming script on a screen of at least one computing device associated with at least one administrative user to recommend security analysis of the software programming script based at least in part on the binary obfuscation classification.

In some embodiments, the present disclosure provides an exemplary technically improved computer-based methods that includes at least the following steps of receiving, by at least one processor, a plurality of software programming scripts, where each software programming script of the plurality of software programming scripts include script text; determining, by the at least one processor, a similarity between the script text of each software programming script and an analyzed script text of each analyzed software programming script in a set of analyzed software programming scripts based on a line-by-line similarity; determining, by the at least one processor, new software programming scripts of the plurality of software programming scripts based on the similarity with each analyzed software programming script in the set of analyzed software programming scripts being less than a threshold script similarity; extracting, by at least one processor, at least one symbol feature from the script text of each new software programming script of the new software programming scripts by recognizing symbols of a symbol set; utilizing, by the at least one processor, an obfuscation machine learning model including a classifier to produce a binary obfuscation classification for each new software programming script of the new software programming scripts, where the binary obfuscation classification includes at least one predicted likelihood of obfuscation relative to at least one obfuscation threshold value; and causing to display, by the at least one processor, an alert indicting obfuscated software programming scripts of the new software programming scripts on a screen of at least one computing device associated with at least one administrative user to recommend security analysis of the software programming script based at least in part on the binary obfuscation classification for each new software programming script of the new software programming scripts.

In some embodiments, the present disclosure provides an exemplary technically improved computer-based system that includes at least the following components of at least one processor in communication with at least one non-transitory computer readable medium storing instructions. The instructions cause the at least one processor to perform steps to: receive a software programming script including script text; receive a symbol set including a plurality of symbols; identify one or more symbols of the plurality of symbols in the script text; determine a frequency of each symbol of the one or more symbols in the script text; determine, an average frequency of the one or more symbols in the script text; determine a normal score of each symbol of the one or more symbols based at least in part on the frequency of each symbol and the average frequency; extract at least one symbol feature as the normal score of each symbol of the one or more symbols; utilize an obfuscation machine learning model including a classifier for binary obfuscation classification to predict that the software programming script is obfuscated based on the at least one symbol feature, where the binary obfuscation classification includes at least one predicted likelihood of obfuscation relative to at least one obfuscation threshold value; and cause to display an alert indicting an obfuscated software programming script on a screen of at least one computing device associated with at least one administrative user to recommend security analysis of the software programming script based at least in part on the binary obfuscation classification.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

FIGS. 1 through 9 illustrate systems and methods of enhancing computer system and network security through automated programming script scanning and learned recognition of malware. The following embodiments provide technical solutions and technical improvements that overcome technical problems, drawbacks and/or deficiencies in the technical fields involving cybersecurity and malware detection. As explained in more detail, below, technical solutions and technical improvements herein include aspects of improved script filtering and quarantine using automated machine learning techniques to mitigate malware spread and impact in a computing system or network. Based on such technical features, further technical benefits become available to users and operators of these systems and methods. Moreover, various practical applications of the disclosed technology are also described, which provide further practical benefits to users and operators that are also new and useful improvements in the art.

Figure 1:
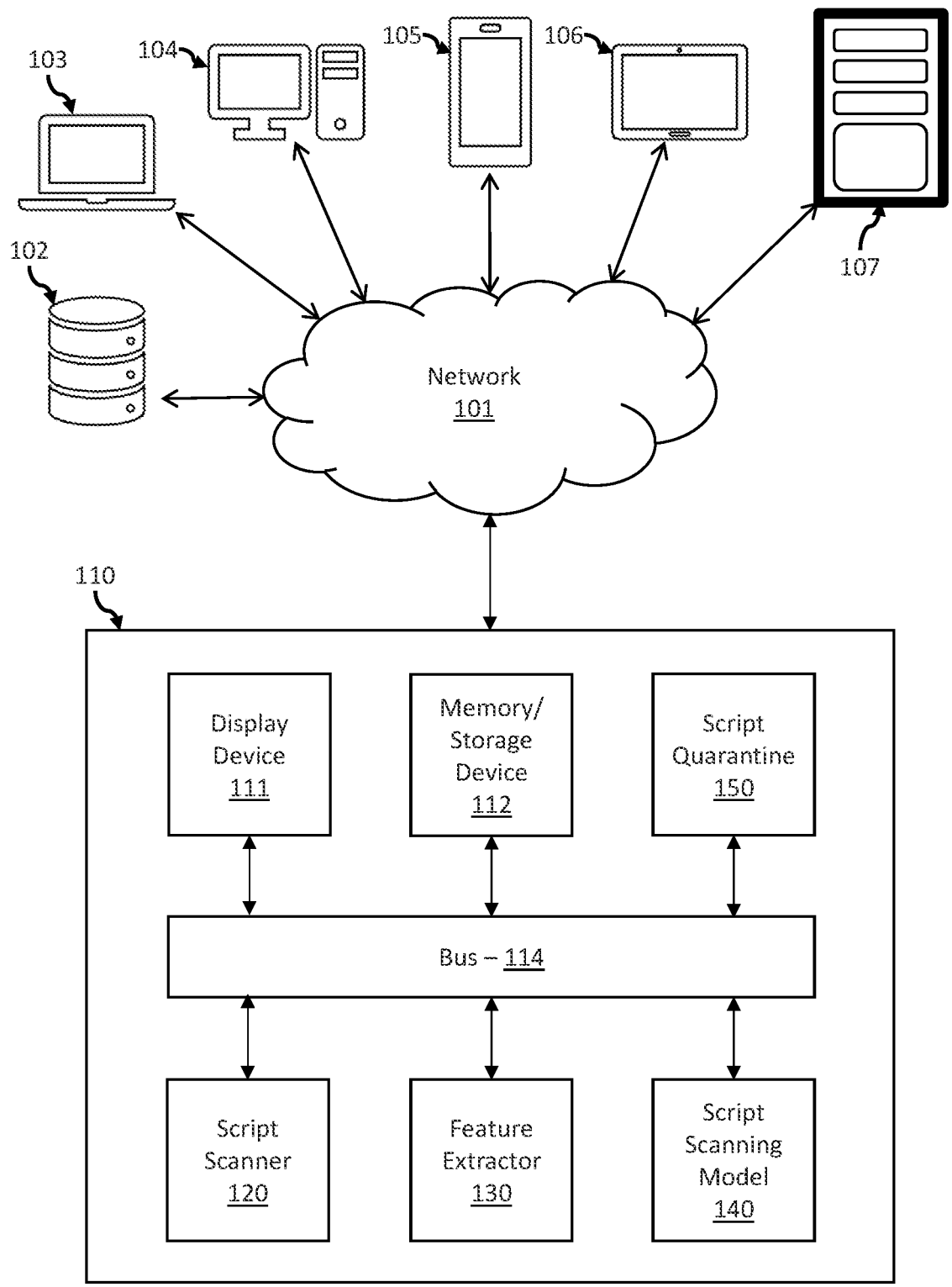
FIGS. 1-8 show one or more schematic flow diagrams, certain computer-based architectures, and/or screenshots of various specialized graphical user interfaces which are illustrative of some exemplary aspects of at least some embodiments of the present disclosure.

FIG. 1 is a block diagram of another exemplary computer-based system for automated malware mitigation in accordance with one or more embodiments of the present disclosure.

In some embodiments, a script scanning system 110 is connected to a network 101 to communicate with computing devices 102-107 across the network and automatically analyze programming scripts, among other code, to identify malware. In some embodiments, the script scanning system 110 may automatically ingest scripts running at each computing device 102-107 and identify scripts with potential malware, e.g., according to an automated recognition of obfuscated script. Thus, the script scanning system 110 may continuously or periodically monitor scripts implemented by runtimes across the network 101 to quickly and efficiently flag and sequester malware without the need for human analysts.

In some embodiments, the computing devices 102-107 can be computing devices that run programming scripts or other programming code, e.g., in a runtime for managing both desktops and servers, including system management, enterprise-wide updates and some which gather central processing unit (CPU) utilization and statistics of the system. For example, the computing devices 102-107 can include Windows™ devices running Powershell™ scripts. Thus, the computing devices 102-107 can include one or more devices including, e.g., databases 102, user computing devices such as notebook computers 103 and desktop computers 104, mobile devices such smartphones 105 and tablets 106, as well as server systems 107, including, e.g., cloud computing systems and servers, among other computing systems such as distributed systems and centralized computing systems.

In some embodiments, each computing device 102-107 can be in communication with the script scanning system 110 via the network 101. However, in some embodiments, one or more of the computing devices 102-107 may be connected directly to the script scanning system 110. Moreover, in some embodiments, the script scanning system 110 may be an application, program or subsystem of one or more of the computing devices 102-107. Accordingly, the script scanning system 110 may include any configuration of software and/or hardware for scanning programming scripts for automatically detecting malware on one or more of the computing devices 102-107.

In some embodiments, the script scanning system 110 may include components configured for performing the automated script scanning and malware mitigation processes. In some embodiments, the script scanning system 110 can include a bus 114 for facilitating communication of data across each component to effectuate each portion of automated script scanning and malware identification. In some embodiments, a display device 111 is in communication with the bus 114 to present information related to the progress and results of the script scans, such as, e.g., number of scripts analyzed, number of obfuscated scripts identified, number of other malware-containing scripts identified, lists of scripts found to include obfuscated code or malware, alerts concerning obfuscated code and malware, among other script statistics and results, as well as system settings and configurations.

In some embodiments, the script scanning system 110 can include a memory or storage device 112 for ingesting (e.g., in a continuous stream, or in periodic batches) and buffering scripts to be analyzed for malware. In some embodiments, the memory or storage device 112 can include, e.g., a hard drive, solid-state drive, flash drive, a random access memory, cache, buffer, or other suitable memory or data storage device, and combinations thereof. However, in some embodiments, the buffering of scripts may be accomplished with a virtual data buffer pointing to locations within the memory or storage device 112 rather than a physically implemented buffer. In some embodiments, where the memory or storage device 112 includes a buffer, the buffer may be a first-in-first-out buffer. Accordingly, in some embodiments, as the script scanning system 110 collects scripts from across the network 101, the scripts may be queued in the buffer using the memory or storage device 112.

In some embodiments, the scripts may be represented in a flat file, such as an image or portable document format (PDF), or other file format that represents the contents in a form that cannot be decoded from the from the format of the file, such as, e.g., optically. As such, the memory or storage device 112 may provide the scripts, either synchronously or asynchronously, to the script scanner 120, e.g., via the bus 114, to scan the contents of each script and identify the characters and symbols represented therein. In some embodiments, the script scanner 120 can include software components, hardware components, or a combination thereof, to analyze the text of each script and identify each character or symbol used therein. Thus, in some embodiments, the script scanner 120 may employ character recognition algorithms to detect each character and symbol within a script, such as, e.g., optical character recognition.

However, in some embodiments, the characters and symbols in the scripts can be decoded by reading the file format. Thus, in some embodiments, the script scanner 120 may be omitted or skipped. However, in some embodiments, the script scanner 120 may also be employed to convert the script into a file format readable by the script scanning system 110. By converting the file format of each script, the script scanning system 110 can analyze scripts of a variety of file formats without the need to be able to read each file format. Rather, the script scanner 120 may convert the file formats to a single script scanning format for use by the feature extractor 130, script scanning model 140 and script quarantine 150, thus simplifying each component and making the script scanning system 110 more efficient.

Moreover, in some embodiments, to prevent redundant computation and further improve efficiency, the script scanner 120 may identify new programming scripts that have not yet been analyzed or scanned for malware and obfuscation. Accordingly, a storage of the script scanner 120, or the memory or storage device 112, may store a set of previously analyzed programming scripts. The previously analyzed programming scripts of the set are scripts that the script scanning system 110 has analyzed and determined whether obfuscation, or other indications of malware, exist. Thus, each script in the set may include the script text and a flag or other indicator indicating whether the script has been found to be obfuscated.

In some embodiments, each programming script to be analyzed can be compared against the set of previously analyzed programming scripts. In some embodiments, the script scanner 120 may compare the script text of the script to be analyzed to the script text of each previously analyzed programming script, e.g., by testing a line-by-line similarity between each script. In some embodiments, the line-by-line similarity can be a score for each line of the script to be analyzed representing a degree of similarity to a line in a particular previously analyzed script. The scores for each line with respect to the particular previously analyzed script can be aggregated to determine a line-by-line similarity. Where the similarity rises above a similarity threshold, the script scanner 120 may identify the script to be analyzed as matching a previously analyzed script, and flag the script to be analyzed with the scan results from the matching previously analyzed script. However, where the script to be analyzed does not have a score relative to any previously analyzed script in the set that rises above the similarity threshold, the script to be analyzed may undergo analysis for obfuscation or other indications of malware.

In some embodiments, the scanned scripts may be, e.g., returned to the memory or storage device 112 to form an analysis queue in a, e.g., hardware or software buffer. In some embodiments, the analysis queue may feed into the feature extractor 130 via, e.g., the bus 114. However, in some embodiments, the script scanner 120 may communicate the scanned scripts directly to the feature extractor 130, e.g., across the bus 114.

In some embodiments, the feature extractor 120 analyzes the characters and symbols in each script to produce symbol features. In some embodiments, the script scanning system 110 is configured to infer malware in a script where code is obfuscated. Thus, the feature extractor 120 may be configured to extract features designed for recognizing obfuscation in the script code. Obfuscation may be correlated with the frequency of certain symbols in a given script. Therefore, the feature extractor 120 may generate a feature for each unique symbol that represents the frequency of each symbol. For example, a symbol feature can include, e.g., a frequency, a normalized frequency based score, an occurrence count, an occurrence percentile relative to all symbols in the script, or other statistic representing the relative occurrence rate of each symbol.

In some embodiments, the feature extractor 120 may prepare the symbol features for ingestion by the script scanning model 140 by generating a feature map or feature vector. For example, a feature vector can include, e.g., a vector having an index for each potential symbol, with a value at each index corresponding to the symbol feature for the associated symbol. For example, the first index position in the vector can represent the letter "a" and the value at the first index can represent the occurrence rate of the letter "a", while the twenty sixth index position could represent the symbol feature for the letter "z." However, other arrangements of feature vector indices and ordering of characters and symbols are contemplated. For example, another option is storing pairs of (letter, frequency) in a dictionary data structure. For example, another option is storing pairs of (letter, frequency) in a dictionary data structure.

In some embodiments, the feature vector for a script may be communicated to the script scanning model 140. In some embodiments, the feature vector is communicated across the bus 114 to the memory or storage device 112 for buffering, similar to the queuing and buffering described above. However, in some embodiments, the feature vector may be communicated directly form the feature extractor 130 to the script scanning model 140, e.g., across the bus 114.

In some embodiments, the script scanning model 140 includes software components, hardware components, or a combination thereof to ingest script feature vectors and determine whether an associated script includes obfuscated script or other indications of malware. In some embodiments, the script scanning model 140 employs machine learning techniques to ingest the feature vector for a script and correlate a classification to the script. In some embodiments, the classification can include, e.g., a binary classification or a multi-class classification. However, in some embodiments, to facilitate quick and efficient training and testing of the script scanning model 140, the script scanning model 140 may employ, e.g., an obfuscation machine learning model to determine whether or not a script is obfuscated, or what type of obfuscation is present in the script. In some embodiments, the obfuscation machine learning model may be a binary classification machine learning model, where the binary classification includes a classification as, e.g., obfuscated or not obfuscated. However, other binary classifications may be employed to infer the presence of malware.

In some embodiments, the script scanning model 140 may include the binary obfuscation machine learning model that may be configured to utilize one or more exemplary AI or machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model, ii) Transfer the input data to the exemplary neural network model, iii) Train the exemplary model incrementally, iv) determine the accuracy for a specific number of timesteps, v) apply the exemplary trained model to process the newly-received input data, vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values, functions and aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, upon producing a classification for a given script, the script scanning model 140 may communicate the classification, e.g., obfuscated or not obfuscated, to a script quarantine 150. In some embodiments, the classification and the associated script may be communicated across the bus 114 to the memory or storage device 112 for buffering, similar to the queuing and buffering described above. However, in some embodiments, the classification and the associated script may be communicated directly from the script scanning model 140 to the script quarantine 150, e.g., across the bus 114.

In some embodiments, where a script has been classified as obfuscated, or to have some other indication of malware, the script quarantine 150 may automatically remove the script from the network 101 and save it to a container or sandbox, e.g., in a virtual machine instance hosted by the script scanning system 110 or a separate computing device. Thus, the script quarantine 150 isolates the obfuscated script from other computing devices on the network 101 but preserves the script for additional analysis, such as, e.g., by an administrator or other automated tools, or a combination thereof.

Figure 2:
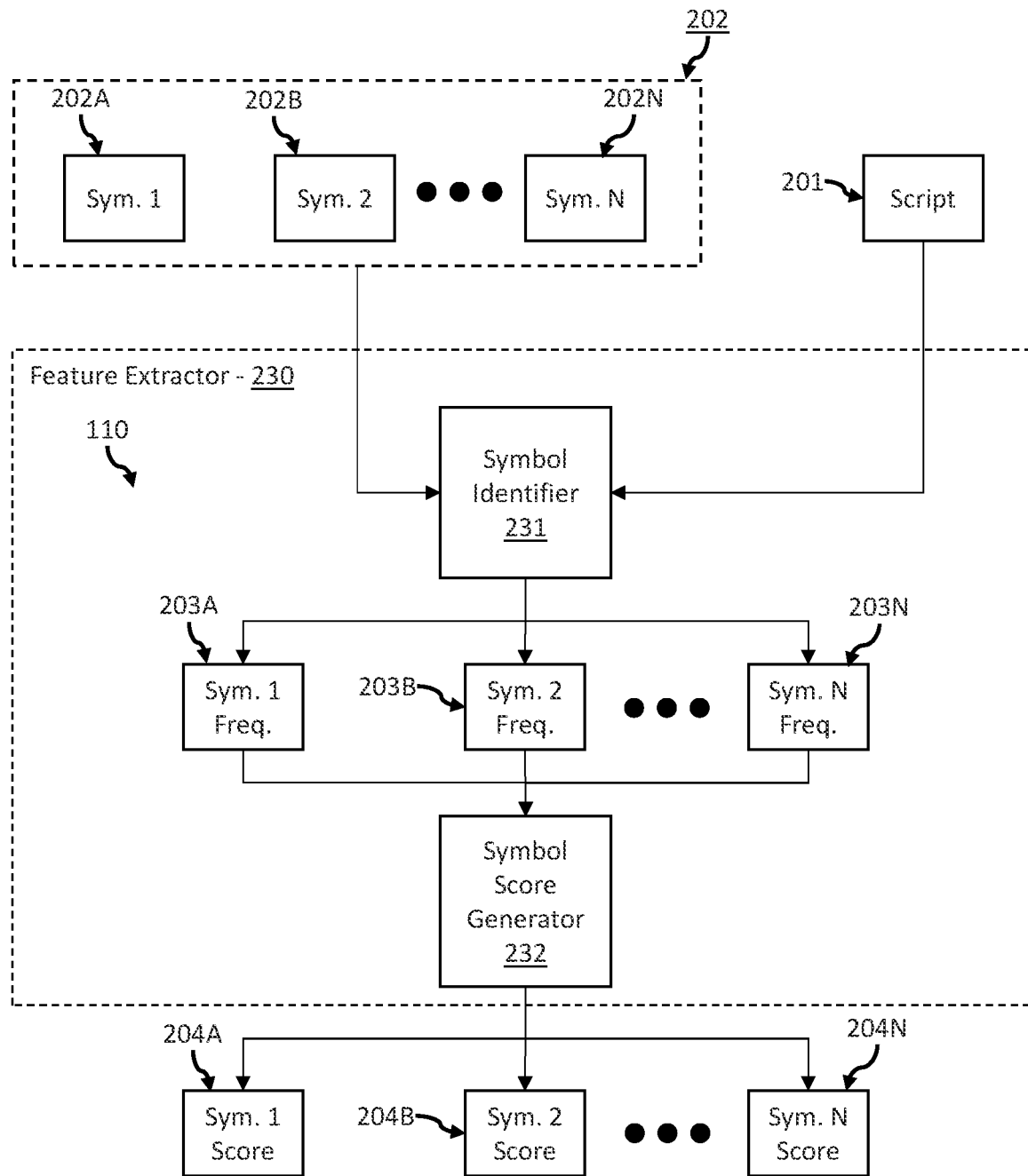

FIG. 2 is a block diagram of another exemplary computer-based system for script feature extraction for automated malware mitigation in accordance with one or more embodiments of the present disclosure.

In some embodiments, a feature extractor 230, such as, e.g., the feature extractor 130 of the script scanning system 110 described above, may receive a script 201 and generate feature vectors including symbol features of symbol scores 204A through 204N. In some embodiments, the feature vector can include, e.g., a fixed-length vector where each index or entry in the vector is assigned to a particular unique symbol, thus specifying the symbol feature for each symbol. However, other forms of feature vectors are also contemplated, such as multidimensional vectors or feature maps.

In some embodiments, a symbol identifier 231 of the feature extractor 230 may be employed to compare a text of the script 201 to known symbols 202 to identify and extract each unique symbol in the script 201. In some embodiments, the symbol identifier 231 may compare each symbol in the text of the script 201 to each known symbols 202A through 202N. Thus, each symbol in the text of the script 201 can be compared to the list, vector, or array of known symbols 202A through 202N and extracted. In some embodiments, where a symbol is used that is not a known symbol, it is extracted as an unknown symbol.

In some embodiments, the symbol identifier 231 may extract each unique symbol by counting each symbol's frequency of occurrence in the text. Thus, the symbol identifier 231 may maintain a tally for the script 201 of the number of occurrences of each unique symbol to produce a symbol frequency 203A through 203N or count for each unique symbol. For example, a vector or array, where each index location in the vector or array may be assigned to one of the unique symbols to be tallied. A tally may be added, e.g., by adding one, to a given index location associated with a given symbol for each occurrence within the script 201 text of that given symbol. Thus, each known symbol 202A through 202N may be extracted as a count in a data structure representing the occurrences or frequency of each symbol to generate symbol frequencies 203A through 203N. Other data structures for maintaining a tally are also contemplated, such as, e.g., a list a separate data record for each symbol 202A through 202N, or other structure. For example, a vector may be formed with the following format to represent the occurrence of each symbol, where the number associated with each symbol below represented the index location of the vector:

{'S': 0, '▮': 1, 'Q': 2, 'd': 3, '.': 4, 'Ж': 5, '=': 6, 'g': 7, 'R': 8, 'P': 9, 'Д': 10, 'ä': 11, 'f': 12, '(': 13, 'k': 14, ')': 15, 'e': 16, 'C': 17, 'U': 18, ' 3 ': 19, 's': 20, 'G': 21, '9': 22, '◆': 23, '!': 24, ' . . . ': 25, '?': 26, '1': 27, 'a': 28, 'm': 29, 'r': 30, '*': 31, '{': 32, 'y': 33, '田': 34, 'b': 35, '>': 36, 'Z': 37, 'e': 38, '车':39, ' И ': 40, '介 ': 41, 'T': 42, '$': 43, 'o': 44, ' ':45, 'á': 46, ' Я ': 47, '\x9d': 48, '®': 49, '▮': 50, 'J': 51, 'H': 52, ']': 53, 'w': 54, 'h': 55, '2': 56, 'H': 57, '\t': 58, '\x99': 59, 'o': 60, 'D': 61, '"': 62, 'O': 63, 'к': 64, 'c': 65, 'n': 66, 'l': 67, '-': 68, 'X': 69, 'á': 70, '"': 71, 'M': 72, 'x': 73, '\x80': 74, '@': 75, 'K': 76, 'v': 77, 'E': 78, 'Ы ': 79, ' Д ': 80, 'F': 81, '^': 82, 'N': 83, '7': 84, '""': 85, '/': 86, '½': 87, 'A': 88, '\n': 89, ';': 90, '6': 91, ',': 92, 'I': 93, '0': 94, 'T': 95, 'j': 96, '5': 97, '}': 98, 'x': 99, '[': 100, '[': 101, 'B': 102, 'i': 103, '&': 104, 'z': 105, 'c': 106, '-': 107, 'P': 108, 'a': 109, 'L': 110, '\xa0': 111, '_': 112, 'π': 113, 'Y': 114, 'q': 115, 'И ': 116, '4': 117, '¯': 118, '\x93': 119, '£': 120, '"': 121, 'T': 122, 'м': 123, ' 大 ': 124, '3': 125, '\x9c': 126, ':': 127, 'u': 128, '#': 129, 'p': 130, '<': 131, '%': 132, 'C': 133, '8': 134, '\\': 135, 'V': 136, 'W': 137, '+': 138, '""': 139, '口': 140, '~': 141, 'Л': 142, 'p': 143, 't': 144, 'unknown': 145}

In some embodiments, the symbol frequencies 203A through 203N may be provided to a symbol score generator 232. Because the symbol frequencies 203A through 203N may depend on the length of the script 201, which may vary widely for both obfuscated and non-obfuscated scripts, correlating frequency to obfuscation may be unreliable in producing accurate predictions of obfuscations. Thus, the symbol score generator 232 may normalize the frequencies to create a score that is comparable across scripts of different lengths. Accordingly, the symbol score generator 232 may generate a normalized frequency score for each symbol frequency 203A through 203N. In some embodiments, the symbol score generator 232 may determine a total number of characters in the script 201 and divide each symbol frequency 203A through 203N by the total number of characters to identify a proportion, on a scale between 0 and 1, for each unique symbol to produce a symbol score 204A through 204N for each known symbol 202. In some embodiments, the symbol score generator 232 may determine the normalized symbol score 204A through 204N using an average frequency of symbols rather than the total number of symbols. For example, the symbol score generator 232 may use all symbol frequencies 203A through 203N for the script to determine the average symbol frequency in the script across all symbols. Each symbol scores 204A through 204N may then be calculated as each symbol frequency 203A through 203N divided by the average symbol frequency to generate the symbol scores 204A through 204N relative to each symbol.

In some embodiments, as described above, the symbol scores 204A through 204N may be stored in a data structure such as a vector or map to create an input feature for a machine learning model to determine an obfuscation classification for the script 201. While each symbol score 204A through 204N can be formed as separate input features, combining each symbol score 204A through 204N into one feature vector or map may improve performance and efficiency, while standardizing input formats across scripts to improve accuracy.

Figure 3:
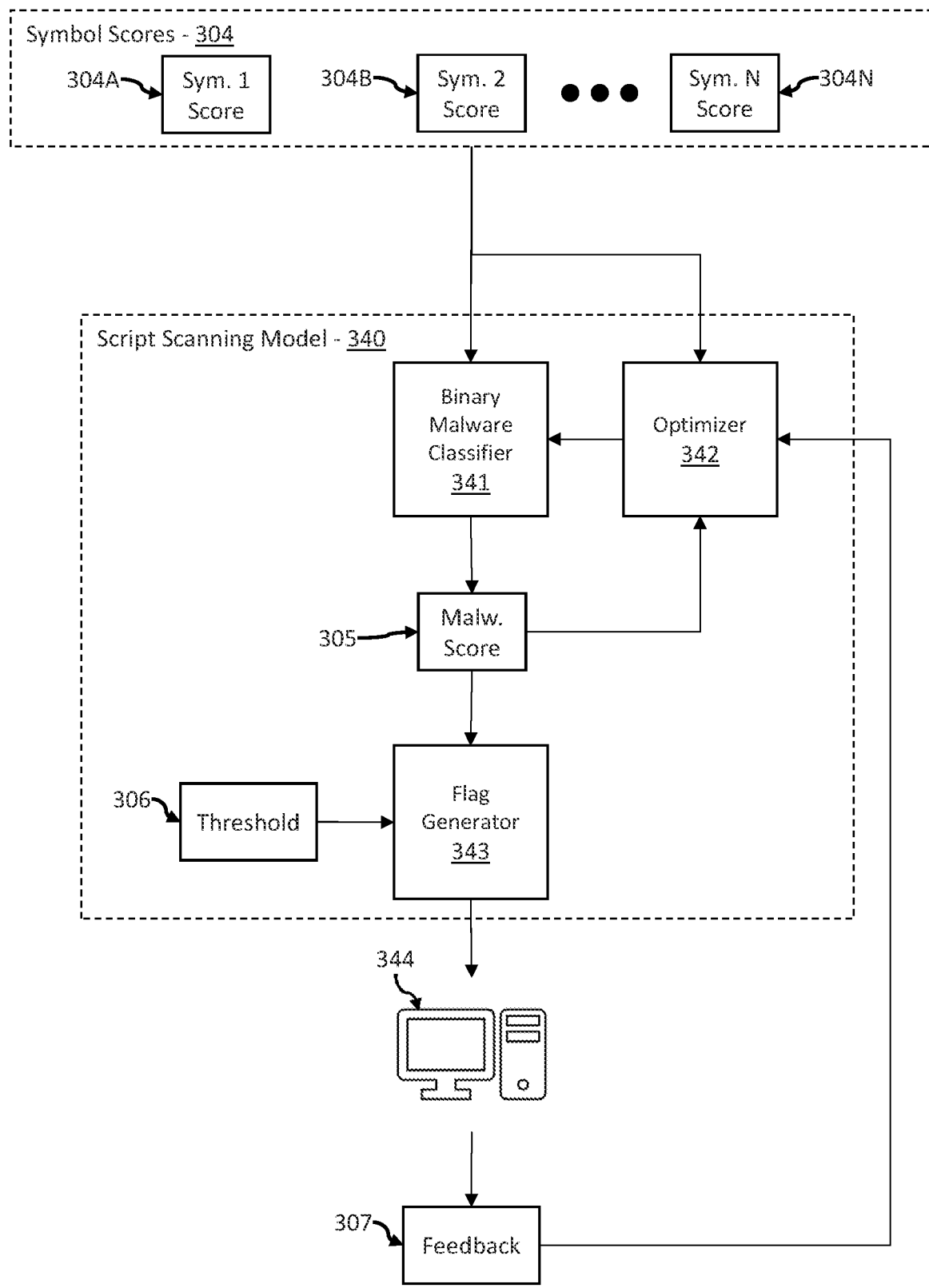

FIG. 3 is a block diagram of another exemplary computer-based system for binary classifier machine learning-based script scanning for automated malware mitigation in accordance with one or more embodiments of the present disclosure.

In some embodiments, symbol scores 304, such as the symbol scores 204A through 204N described above, may be provided to a script scanning model 340 to determine a likelihood of obfuscation of the script based on the symbol scores 304. In some embodiments, the script scanning model 340 generates a binary classification of the script, e.g., script 201 above, as obfuscated or non-obfuscated. Accordingly, the script scanning model 340 employs a binary obfuscation classifier 341 to generate an obfuscation score 305 representative of a probability that the script is obfuscated.

In some embodiments, non-alphanumeric characters (e.g., special characters), such as, e.g., '"'.', 'Ж ', '=', 'Д', 'ä', '(',')', ' 3 ', '◆', '!', ' . . . ', '?', '*', '{', 'H', '>', '车', 'И', '介', '$', ' ', 'á', ' Я ', '\x9d', '®', '"', 'H', ']', '\t', '\x99', '"', 'к', 'l', '-', 'â', '"', '\x80', '@', 'Ы', 'Д', '^', '""', '/', '½ ', '\n', ';', ',', ',', '}', '"", '[', '&', '—', '\xa0', '_', 'П', 'И', '¯', '\x93', '£', 'с', 'м', ' 大 ', '\x9c', ':', '#', '<', '%', '\\'. '+', '""', '口', '~', 'Л ', among others may be correlated to script obfuscation indicating malware in the script. Thus, the binary obfuscation classifier 341 may be trained to correlate the relative occurrence of the special characters, relative to the occurrence of alphanumeric characters, as represented by the symbol scores 304 to a likelihood that the script is obfuscated. Therefore, the binary obfuscation classifier 341 may ingest a feature vector of the symbol scores 304 to produce an obfuscation score 305 representing the probability of obfuscation on a scale of between 0 and 1. In some embodiments, the obfuscation score 305 is produced by, e.g., a strong classifier, such as a deep neural network. Thus, the obfuscation score 305 indicates a probability of obfuscations on a scale of between 0 and 1. However, in some embodiments, ensemble or random forest binary classification models may be employed where the obfuscation score 305 is a binary score (e.g., 0 or 1) to indicated whether the models forming the ensemble or random forest vote for a obfuscation or vote for non-obfuscation.

In some embodiments, to determine whether the obfuscation score 305 indicates a classification as obfuscated or as non-obfuscated, a threshold probability may be employed, where an obfuscation score 305 exceeding the probability threshold results in a classification as "obfuscated" and an obfuscation score 305 below the probability threshold results in a classification as "non-obfuscated" or "safe". However, where the obfuscation score 305 is a binary score (0 or 1), the flag generator 343 may omit the threshold and determine a classification of "obfuscated" where the obfuscation score 305 is 1. Thus, in some embodiments, a flag generator 343 may receive the obfuscation score 305 and compare the obfuscation score 305 to a threshold 306 to determine the classification of the script. Where the flag generator 343 classifies the script as obfuscated based on the comparison between the obfuscation score 305 and the threshold 306, the flag generator 343 may tag the script with a flag or other indicator, e.g., in metadata of the script or by some other technique. As described above, the flag may be used to generate an alert to a user or administrator, e.g., at computing device 344, to surface the script for analysis by the user or administrator.

In some embodiments, the script scanning model 340 may be trained to determine the obfuscation classification based on the symbol scores 304. An initial training may be performed using a training dataset of symbol scores 304 that correspond to scripts known to be obfuscated or non-obfuscated using an optimizer 342. For the initial training, the binary obfuscation classifier 341 may predict the obfuscation score 305 for each symbol score 304 set, and the flag generator 343 may classify each symbol score 304 set based on the threshold 306. Labels associated with the known classifications of each symbol score 304 set in the training dataset and the classification determined by the script scanning model 340 may be compared to determine a loss with the optimizer 342. The loss may be backpropagated to the binary obfuscation classifier 341 to update model parameters and train the binary obfuscation classifier 341. Various thresholds 305 may also be tested to improve the loss. For example, the binary obfuscation classifier 341 may be trained using many different thresholds 306 to identify a threshold 306 to a most accurate trained script scanning model 340. For example, the threshold 306 may be about, e.g., 0.5, 0.6, 0.7 or other suitable threshold.

However, in some embodiments, the optimizer 342 may train the binary obfuscation classifier 341 in an online fashion. Thus, upon presenting the obfuscation classification for a script to the user computing device 344, a user may analyze the script and determine whether an obfuscation flag is correct, to produce feedback 307. The feedback 307 may be provided to the optimizer 342, which may compare the feedback 307 to the classification for the symbols cores 304 and determine a loss. The binary obfuscation classifier 341 may be updated with parameter updates based on a calculated loss between the classification and the feedback 307. In some embodiments, the loss may be determined using any suitable loss function, such as, e.g., cross-entropy loss or other suitable classification loss function.

In some embodiments, because the user may only review flagged scripts, e.g., scripts classified as obfuscated, the feedback 307 may only be in response to obfuscation classifications, and not non-obfuscation classifications. This may bias the online training away from identifying scripts as obfuscated. Thus, periodically, the user computing device 344 may be provided with a sample of scripts classified as non-obfuscated for review by an analyst. Thus, the analyst or user may provide feedback 307 correcting classifications of scripts incorrectly classified as non-obfuscated.

Accordingly, the script scanning model 340 may be trained to correlate symbol scores 304 to a likelihood of the script being obfuscated, thus indicating malware in the script. As a result, scripts may be quickly and efficiently classified as obfuscated or non-obfuscated, enabling a system to automatically analyze, e.g., hundreds, thousands, millions, and potentially billions of scripts to be identified as potentially containing malware, thus improving the security of a computer system and network of computer systems.

Figure 4:
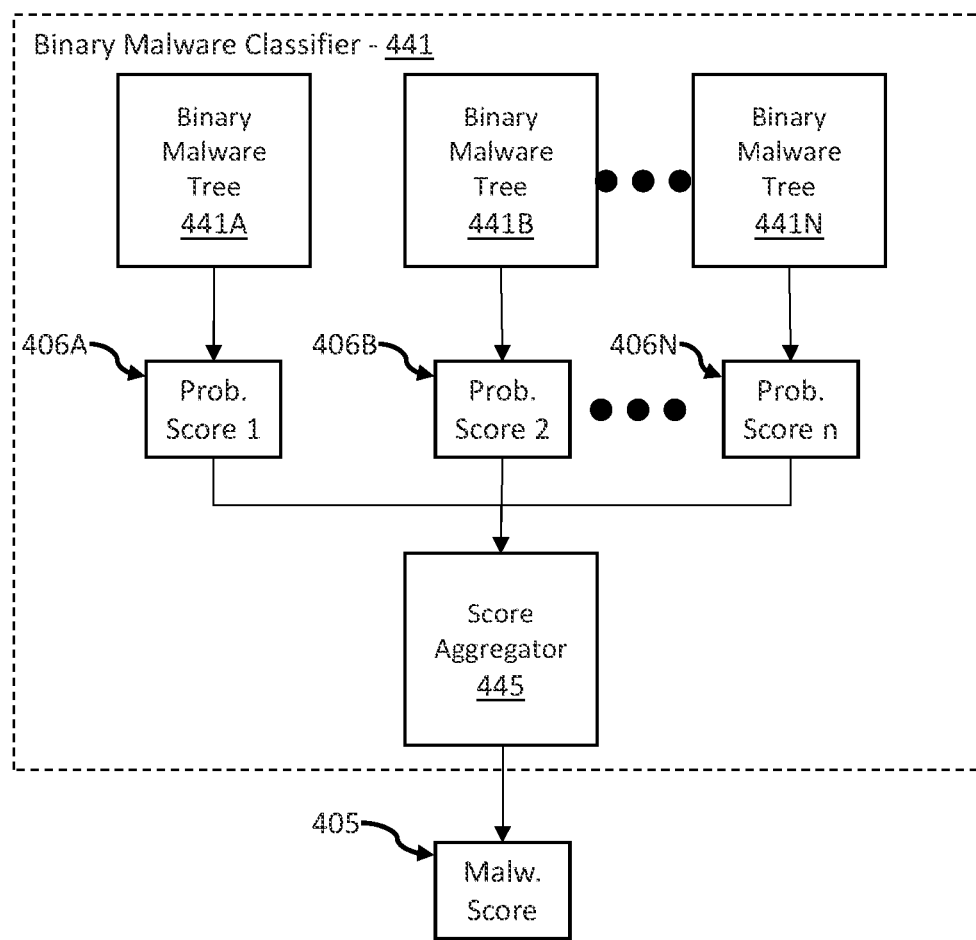

FIG. 4 is a block diagram of another exemplary computer-based system binary classifier machine learning-based script scanning for automated malware mitigation classifier machine learning-based script scanning for automated malware mitigation in accordance with one or more embodiments of the present disclosure.

In some embodiments, a binary obfuscation classifier 441, such as the binary obfuscation classifier 341 described above, may employ a system of weak classifiers rather than a single strong classifier. Weak classifiers are easy to train for binary classification tasks, facilitating quick and efficient training and classification without comprising accuracy of binary classification. Thus, in some embodiments, the binary obfuscation classifier 441 may employ a random forest of classifiers including multiple binary obfuscation trees 441A through 441N. Accordingly, symbol scores, such as symbols cores 304 described above, may be provided to each binary obfuscation tree 441A through 441N. For example, the binary obfuscation trees 441A through 441N may be configured to include, e.g., 100 trees, according to the parameters of Table 1 below:

TABLE 1 n_estimators=100 # The number of trees in the forest.
criterion='gini'
max_depth=None
min_samples_split=2
min_samples_leaf=1
min_weight_fraction_leaf=0.0
max_features='auto'
max_leaf_nodes=None
min_impurity_decrease=0.0
min_impurity_split=None
bootstrap=True
oob_score=False
n_jobs=None
random_state=None
verbose=0
warm_start=False
class_weight=None
ccp_alpha=0.0
max_samples=None Each binary obfuscation tree 441A through 441N may employ an ensemble of classifiers (e.g., leaf nodes), e.g., weak classifiers, to determine a respective probability score 406A through 406N for each binary obfuscation tree 441A through 441N. In some embodiments, each classifier may employ a different classification model. The classification models in each binary obfuscation tree 441A through 441N may differ by, e.g., model architecture, learned parameters, or learned hyperparameters, or a combination thereof.

In some embodiments, the classifiers of the binary obfuscation trees 441A through 441N may be implemented with bootstrap aggregation ("bagging"). As such, upon training, the binary obfuscation classifier 441, a training set of symbol scores may be sampled with replacement to generate multiple new training sets, each with a size of the original training set. Similarly, upon predicting an obfuscation score, the bagging approach may be employed to form multiple samples of symbol scores from the input feature vector of symbol scores. A binary obfuscation tree 441A through 441N is employed to analyze a respective on of the samples of symbol scores, thus producing a respective probability score 406A through 406N.

As a result, each binary obfuscation tree 441A through 441N generate its own classification of the script based on the symbol scores. However, the ultimate obfuscation score 405 is a result of the voting of the various probability scores 406A through 406N. In some embodiments, a score aggregator 445 receives each probability score 406A through 406N and assigns a classification of obfuscated or non-obfuscated based on a threshold, such as the threshold 306 described above. Each classification forms a vote for either obfuscated or non-obfuscated based on whether the associated probability score 406A through 406N exceeds the threshold. Accordingly, the score aggregator 445 may count the number of binary obfuscation trees 441A through 441N indicating a classification of obfuscated, and the number of binary obfuscation trees 441A through 441N indicating a classification of non-obfuscated. In some embodiments, the score aggregator 445 may produce the obfuscation score 405 based on the number of votes for obfuscated and the number of votes of non-obfuscated. As such, the obfuscation score 405 may be a 1 or 0, where 1 indicates a classification of obfuscated due to a greater number of votes for obfuscated than for non-obfuscated, and 0 indicates a classification of non-obfuscated due to a greater number of votes for non-obfuscated than for obfuscated. However, in some embodiments, other aggregation methods may be used, such as, e.g., averaging the probability scores 406A through 406N to generate an obfuscation score 405 representing the average of probabilities of the symbol scores being correlated to obfuscation.

Accordingly, the binary obfuscation classifier 441 may quickly and efficiently determine whether any given script is obfuscated, and thus whether malware is likely to be contained therein. The use of a random forest architecture facilitates quick and efficient training, while maintain accuracy of classifications.

Figure 5:
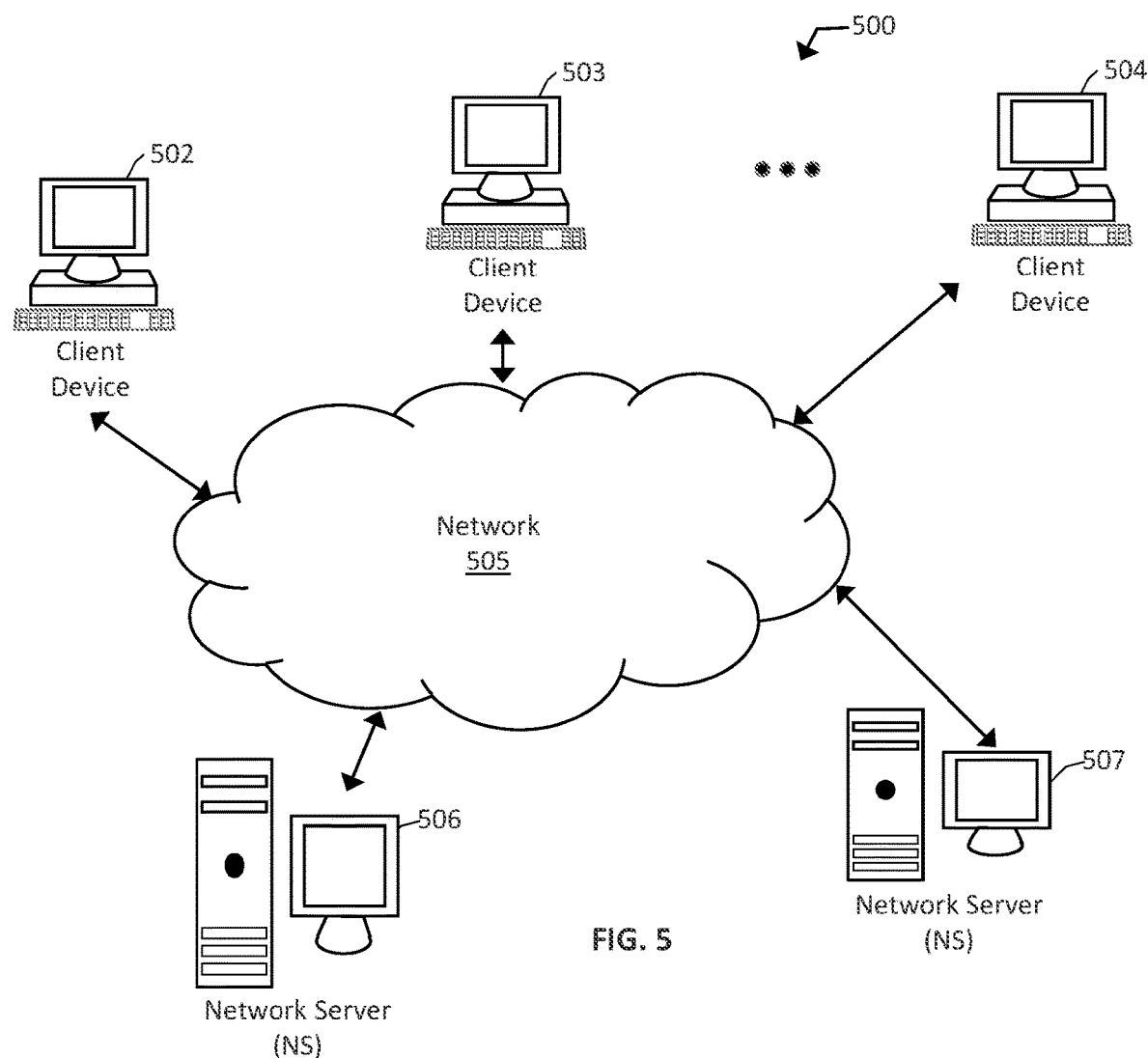

FIG. 5 depicts a block diagram of an exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 500 may be configured to manage a large number of members and concurrent transactions, as detailed herein. In some embodiments, the exemplary computer-based system and platform 500 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 5, members 502-504 (e.g., clients) of the exemplary computer-based system and platform 500 may include virtually any computing device capable of receiving and sending a message over a network (e.g., cloud network), such as network 505, to and from another computing device, such as servers 506 and 507, each other, and the like. In some embodiments, the member devices 502-504 may be personal computers, multiprocessor systems, microprocessor-based or programmable consumer electronics, network PCs, and the like. In some embodiments, one or more member devices within member devices 502-504 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 502-504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 502-504 may include may run one or more applications, such as Internet browsers, mobile applications, voice calls, video games, videoconferencing, and email, among others. In some embodiments, one or more member devices within member devices 502-504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 502-504 may be specifically programmed by either Java, .Net, QT, C, C++ and/or other suitable programming language. In some embodiments, one or more member devices within member devices 502-504 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 505 may provide network access, data transport and/or other services to any computing device coupled to it. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 505 may also include mass storage, such as network attached storage (NAS), a storage area network (SAN), a content delivery network (CDN) or other forms of computer or machine readable media.

In some embodiments, the exemplary server 506 or the exemplary server 507 may be a web server (or a series of servers) running a network operating system, examples of which may include but are not limited to Microsoft Windows Server, Novell NetWare, or Linux. In some embodiments, the exemplary server 506 or the exemplary server 507 may be used for and/or provide cloud and/or network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be also implemented in the exemplary server 507 and vice versa.

In some embodiments, one or more of the exemplary servers 506 and 507 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 501-504.

In some embodiments and, optionally, in combination of any embodiment described above or below, for example, one or more exemplary computing member devices 502-504, the exemplary server 506, and/or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
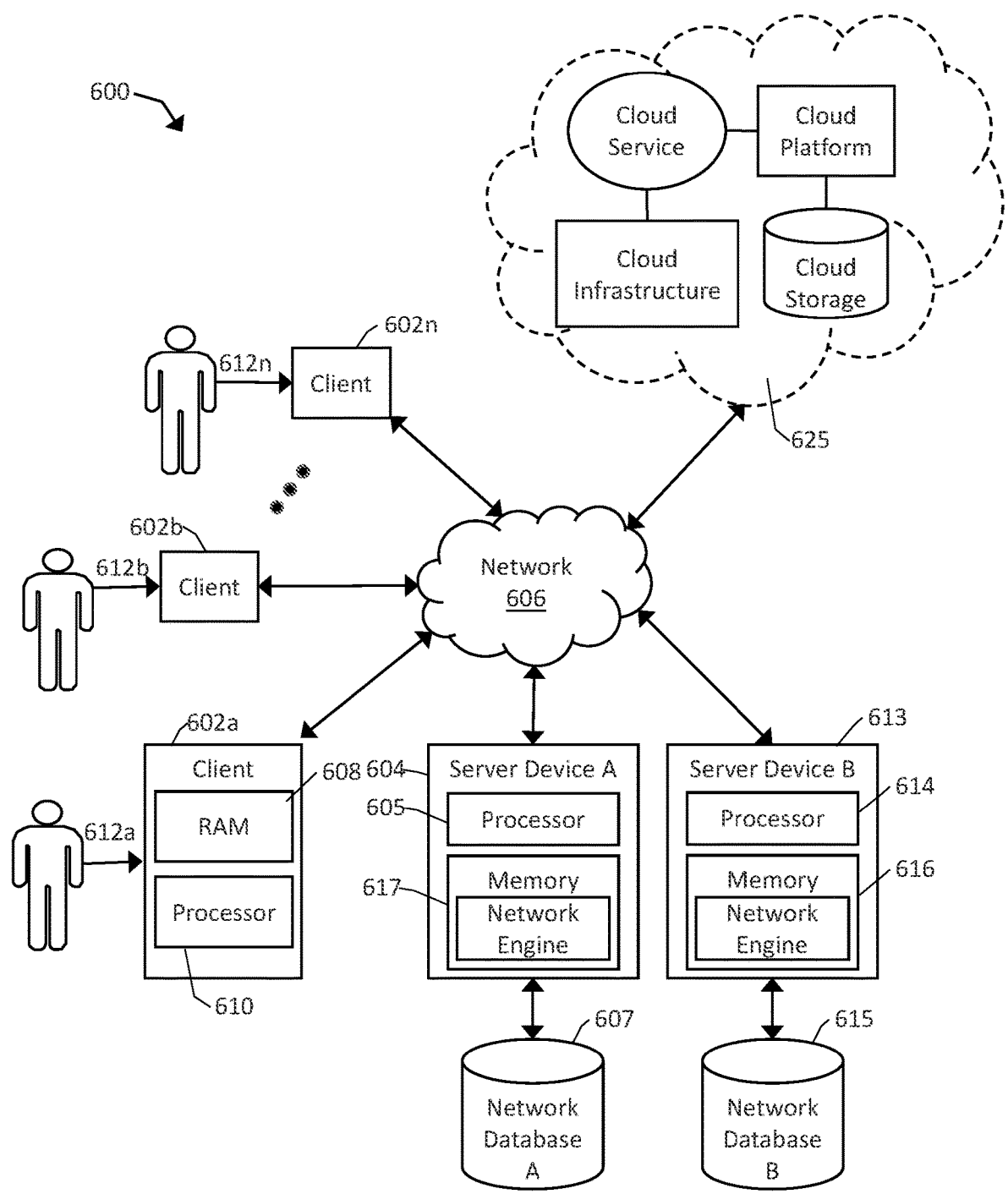

FIG. 6 depicts a block diagram of another exemplary computer-based system and platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 602a, 602b thru 602n shown each at least includes a computer-readable medium, such as a random-access memory (RAM) 608 coupled to a processor 610 or FLASH memory. In some embodiments, the processor 610 may execute computer-executable program instructions stored in memory 608. In some embodiments, the processor 610 may include a microprocessor, an ASIC, and/or a state machine. In some embodiments, the processor 610 may include, or may be in communication with, media, for example computer-readable media, which stores instructions that, when executed by the processor 610, may cause the processor 610 to perform one or more steps described herein. In some embodiments, examples of computer-readable media may include, but are not limited to, an electronic, optical, magnetic, or other storage or transmission device capable of providing a processor, such as the processor 610 of client 602a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 602a through 602n may also comprise a number of external or internal devices such as a mouse, a CD-ROM, DVD, a physical or virtual keyboard, a display, or other input or output devices. In some embodiments, examples of member computing devices 602a through 602n (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In some embodiments, member computing devices 602a through 602n may be specifically programmed with one or more application programs in accordance with one or more principles/methodologies detailed herein. In some embodiments, member computing devices 602a through 602n may operate on any operating system capable of supporting a browser or browser-enabled application, such as Microsoft™ Windows™, and/or Linux. In some embodiments, member computing devices 602a through 602n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 602a through 602n, users, 612a through 602n, may communicate over the exemplary network 606 with each other and/or with other systems and/or devices coupled to the network 606. As shown in FIG. 6, exemplary server devices 604 and 613 may be also coupled to the network 606. In some embodiments, one or more member computing devices 602a through 602n may be mobile clients.

In some embodiments, at least one database of exemplary databases 607 and 615 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
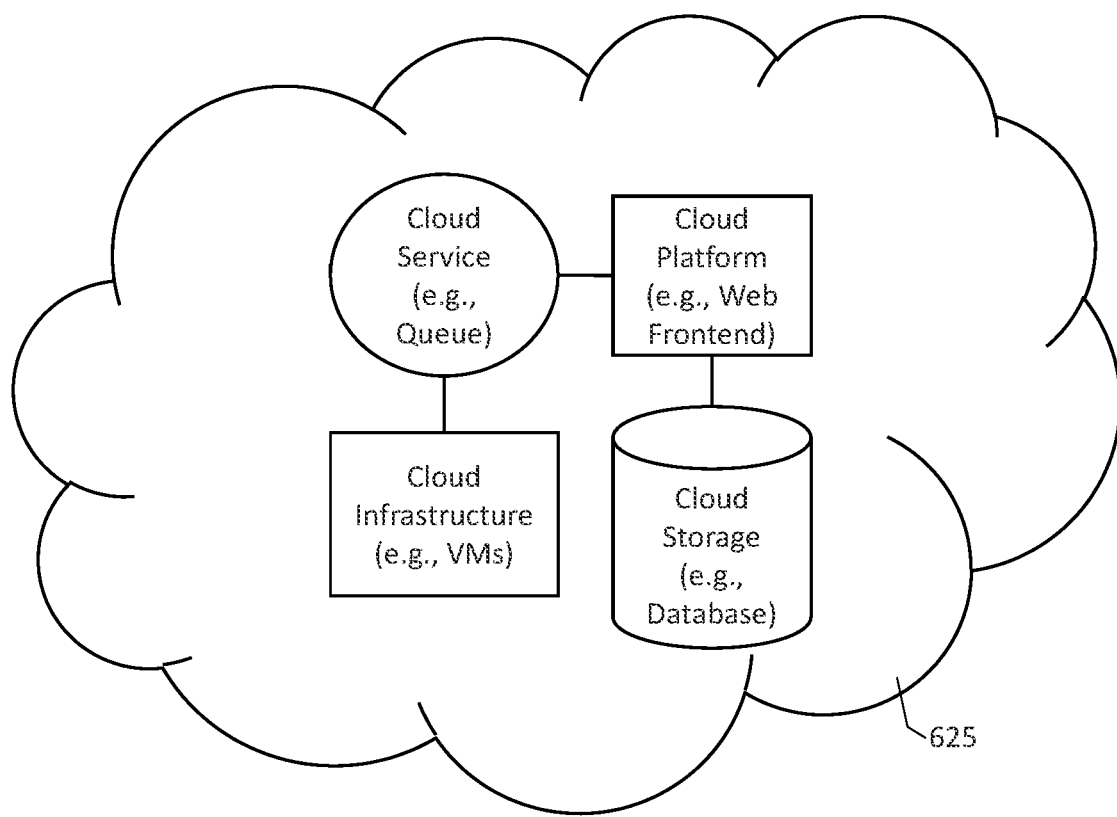
Figure 8:
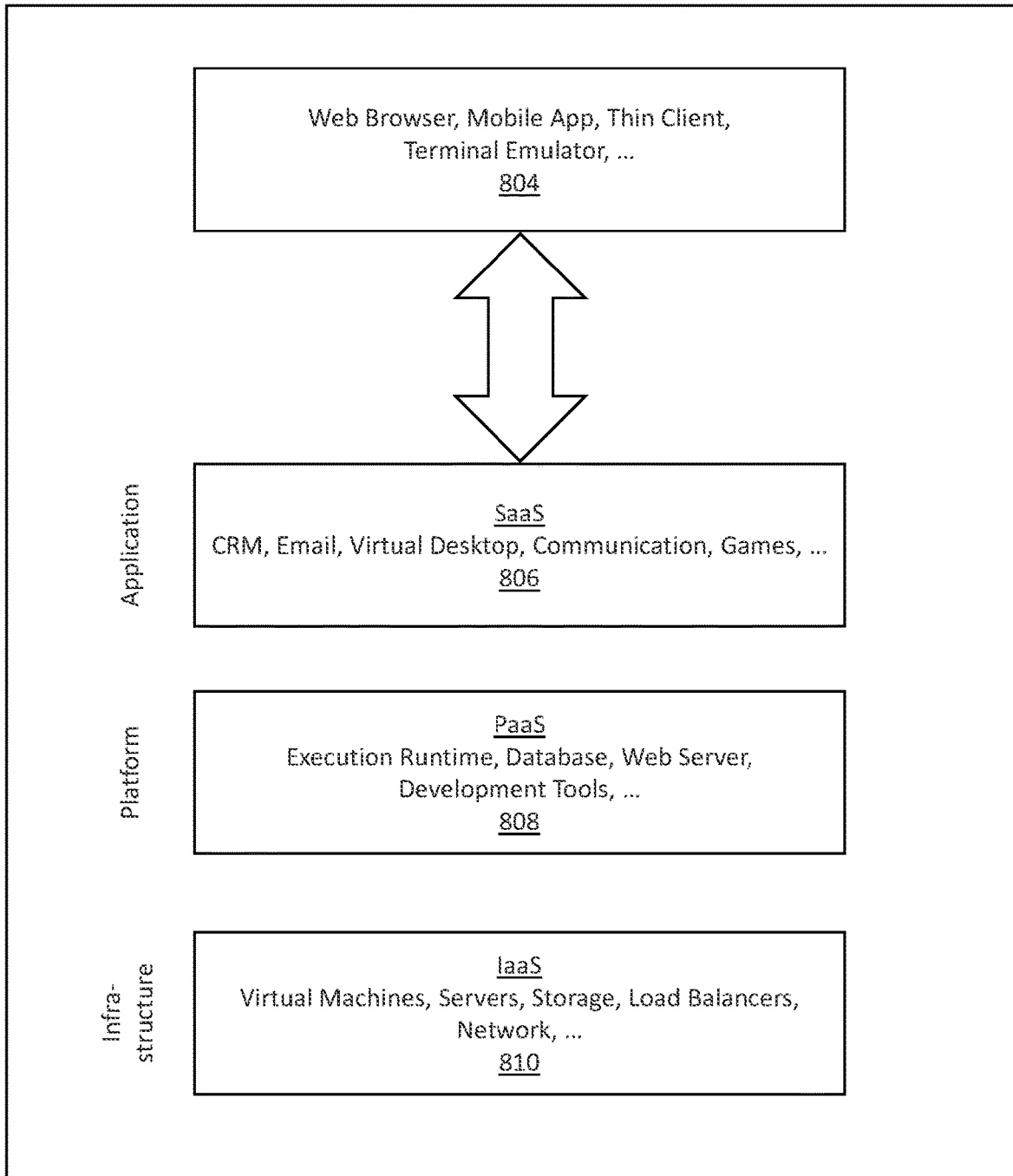

In some embodiments, the exemplary inventive computer-based systems/platforms, the exemplary inventive computer-based devices, and/or the exemplary inventive computer-based components of the present disclosure may be specifically configured to operate in a cloud computing/architecture 625 such as, but not limiting to: infrastructure a service (IaaS) 810, platform as a service (PaaS) 808, and/or software as a service (SaaS) 806 using a web browser, mobile app, thin client, terminal emulator or other endpoint 804. FIGS. 7 and 8 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a web site, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

At least some aspects of the present disclosure will now be described with reference to the following numbered clauses.

1. A method comprising:
receiving, by at least one processor, a software programming script comprising script text;
receiving, by the at least one processor, a symbol set comprising a plurality of symbols;
identifying, by at least one processor, one or more symbols of the plurality of symbols in the script text;
determining, by the at least one processor, a frequency of each symbol of the one or more symbols in the script text;
determining, by the at least one processor, an average frequency of the one or more symbols in the script text;
determining, by the at least one processor, a normal score of each symbol of the one or more symbols based at least in part on the frequency of each symbol and the average frequency;
extracting, by the at least one processor, at least one symbol feature as the normal score of each symbol of the one or more symbols.
utilizing, by the at least one processor, an obfuscation machine learning model comprising a classifier for binary obfuscation classification to predict that the software programming script is obfuscated based on the at least one symbol feature;
  wherein the binary obfuscation classification comprises at least one predicted likelihood of obfuscation relative to at least one obfuscation threshold value; and
  causing to display, by the at least one processor, an alert indicting an obfuscated software programming script on a screen of at least one computing device associated with at least one administrative user to recommend security analysis of the software programming script based at least in part on the binary obfuscation classification.

2. The method of clause 1, further comprising logging, by the at least one processor, the software programming script in an obfuscation log comprising a list of entries of obfuscated scripts.

3. The method of clause 1, further comprising:
  receiving, by the at least one processor, a stream of a plurality of software programming scripts into a buffer; and
  receiving, by the at least one processor, the software programming script from the plurality of software programming scripts in the buffer.

4. The method of clause 3, wherein the buffer comprises a first-in, first-out (FIFO) buffer.

5. The method of clause 1, wherein the obfuscation machine learning model comprises an ensemble model of classifiers.

6. The method of clause 5, further comprising:
  determining, by the at least one processor, a predicted likelihood obfuscation of the at least one predicted likelihood of obfuscation by each classifier of the ensemble of classifiers based at least in part on the at least one symbol feature;
  determining, by the at least one processor, an obfuscation prediction for each classifier of the ensemble of classifiers by comparing each predicted likelihood of obfuscation with the at least one obfuscation threshold value;
  determining, by the at least one processor, a quantity of obfuscation votes representative of a number of obfuscation predictions predicting that the software programming script is obfuscated;
  determining, by the at least one processor, a quantity of non-obfuscation votes representative of a number of obfuscation predictions predicting that the software programming script is not obfuscated; and
  determining, by the at least one processor, the binary obfuscation classification based on a greater one of the quantity of obfuscation votes and the quantity of non-obfuscation votes.

7. The method of clause 6, wherein the ensemble of classifiers comprises a plurality of different classification models.

8. The method of clause 6, wherein the ensemble of classifiers comprises bootstrap aggregation.

9. The method of clause 1, further comprising:
  receiving, by the at least one processor, a set of analyzed software programming scripts;
  determining, by the at least one processor, a similarity between the software programming script and each analyzed software programming script in the set of analyzed software programming scripts based on a line-by-line similarity of the script text of the software programming script and a respective analyzed script text of each analyzed software programming script in the set of analyzed software programming scripts; and
  determining, by the at least one processor, the software programming script is a new software programming script based on the similarity with each analyzed software programming script in the set of analyzed software programming scripts being less than a threshold script similarity.

10. The method of clause 1, wherein the at least one obfuscation threshold value is automatically determined based on training the obfuscation machine learning model with a ground-truth dataset.

11. A method comprising:
  receiving, by at least one processor, a plurality of software programming scripts;
    wherein each software programming script of the plurality of software programming scripts comprise script text;
  determining, by the at least one processor, a similarity between the script text each software programming script and an analyzed script text of each analyzed software programming script in a set of analyzed software programming scripts based on a line-by-line similarity;
  determining, by the at least one processor, new software programming scripts of the plurality of software programming scripts based on the similarity with each analyzed software programming script in the set of analyzed software programming scripts being less than a threshold script similarity;
  extracting, by at least one processor, at least one symbol feature from the script text of each new software programming script of the new software programming scripts by recognizing symbols of a symbol set;
  utilizing, by the at least one processor, an obfuscation machine learning model comprising a classifier to produce a binary obfuscation classification for each new software programming script of the new software programming scripts;
    wherein the binary obfuscation classification comprises at least one predicted likelihood of obfuscation relative to at least one obfuscation threshold value; and
  causing to display, by the at least one processor, an alert indicting obfuscated software programming scripts of the new software programming scripts on a screen of at least one computing device associated with at least one administrative user to recommend security analysis of the software programming script based at least in part on the binary obfuscation classification for each new software programming script of the new software programming scripts.

12. The method of clause 11, further comprising:
  determining, by the at least one processor, an average frequency of symbols of the symbol set;
  determining, by the at least one processor, a normal score of each symbol of the symbol set based at least in part on the frequency of each symbol and the average frequency;
  determining, by the at least one processor, the at least one symbol feature as the normal score of each symbol of the symbol set.

13. The method of clause 11, further comprising:
  receiving, by the at least one processor, the plurality of software programming scripts as a stream into a buffer.

14. The method of clause 13, wherein the buffer comprises a first-in, first-out (FIFO) buffer.

15. The method of clause 11, wherein the obfuscation machine learning model comprises an ensemble model of classifiers.

16. The method of clause 15, further comprising:
  determining, by the at least one processor, for each new software programming script of the new software programming scripts, a predicted likelihood obfuscation of the at least one predicted likelihood of obfuscation by each classifier of the ensemble of classifiers based at least in part on the at least one symbol feature;

determining, by the at least one processor, an obfuscation prediction for each classifier of the ensemble of classifiers by comparing each predicted likelihood of obfuscation with the at least one obfuscation threshold value;

determining, by the at least one processor, a quantity of obfuscation votes representative of a number of obfuscation predictions predicting that the software programming script is obfuscated;

determining, by the at least one processor, a quantity of non-obfuscation votes representative of a number of obfuscation predictions predicting that the software programming script is not obfuscated; and determining, by the at least one processor, the binary obfuscation classification for each new software programming script of the new software programming scripts based on a greater one of the quantity of obfuscation votes and the quantity of non-obfuscation votes.

7. The method of clause 6, wherein the ensemble of classifiers comprises a plurality of different classification models.

18. The method of clause 16, wherein the ensemble of classifiers comprises bootstrap aggregation.

19. The method of clause 11, wherein the at least one obfuscation threshold value is automatically determined based on training the obfuscation machine learning model with a ground-truth dataset.

20. A system comprising:
at least one processor in communication with at least one non-transitory computer readable medium storing instructions causing the at least one processor to perform steps to:
receive a software programming script comprising script text;
receive a symbol set comprising a plurality of symbols;
identify one or more symbols of the plurality of symbols in the script text;
determine a frequency of each symbol of the one or more symbols in the script text;
determine, an average frequency of the one or more symbols in the script text;
determine a normal score of each symbol of the one or more symbols based at least in part on the frequency of each symbol and the average frequency;
extract at least one symbol feature as the normal score of each symbol of the one or more symbols.
utilize an obfuscation machine learning model comprising a classifier for binary obfuscation classification to predict that the software programming script is obfuscated based on the at least one symbol feature;
wherein the binary obfuscation classification comprises at least one predicted likelihood of obfuscation relative to at least one obfuscation threshold value; and
cause to display an alert indicting an obfuscated software programming script on a screen of at least one computing device associated with at least one administrative user to recommend security analysis of the software programming script based at least in part on the binary obfuscation classification.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

The invention claimed is:

1. A method comprising:
receiving, by at least one processor, a plurality of software programming scripts;
wherein each software programming script of the plurality of software programming scripts
comprise script text;
determining, by the at least one processor, a similarity between the script text of each software programming script and an analyzed script text of each analyzed software programming script in a set of analyzed software programming scripts based on a line-by-line comparison;
determining, by the at least one processor, at least one of the plurality of software programming scripts is a new software programming script based on the similarity with each analyzed software programming script being less than a threshold script similarity;
extracting, by the at least one processor, at least one symbol feature from the script text of each new software programming script of the new software programming scripts by recognizing symbols of a symbol set;
utilizing, by the at least one processor, an obfuscation machine learning model comprising a classifier to produce a binary obfuscation classification for the new software programming script;
wherein the binary obfuscation classification comprises at least one predicted likelihood of obfuscation relative to at least one obfuscation threshold value; and
causing to display, by the at least one processor, an alert indicting obfuscated software programming scripts of the new software programming script on a screen of at least one computing device associated with at least one administrative user to recommend security analysis of the software programming script based at least in part on the binary obfuscation classification for the new software programming script.

2. The method of claim 1, further comprising:
determining, by the at least one processor, an average frequency of symbols of the symbol set;
determining, by the at least one processor, a normal score of each symbol of the symbol set based at least in part on the frequency of each symbol and the average frequency;
determining, by the at least one processor, the at least one symbol feature as the normal score of each symbol of the symbol set.

3. The method of claim 1, further comprising:
receiving, by the at least one processor, the plurality of software programming scripts as a stream into a buffer.

4. The method of claim 3, wherein the buffer comprises a first-in, first-out (FIFO) buffer.

5. The method of claim 1, wherein the obfuscation machine learning model comprises an ensemble model of classifiers.

6. The method of claim 5, further comprising:
determining, by the at least one processor, for each new software programming script of the new software programming scripts, a predicted likelihood obfuscation of the at least one predicted likelihood of obfuscation by each classifier of the ensemble of classifiers based at least in part on the at least one symbol feature;
determining, by the at least one processor, an obfuscation prediction for each classifier of the ensemble of classifiers by comparing each predicted likelihood of obfuscation with the at least one obfuscation threshold value;

determining, by the at least one processor, a quantity of obfuscation votes representative of a number of obfuscation predictions predicting that the software programming script is obfuscated;

determining, by the at least one processor, a quantity of non-obfuscation votes representative of a number of obfuscation predictions predicting that the software programming script is not obfuscated; and determining, by the at least one processor, the binary obfuscation classification for each new software programming script of the new software programming scripts based on a greater one of the quantity of obfuscation votes and the quantity of non-obfuscation votes.

7. The method of claim 6, wherein the ensemble of classifiers comprises a plurality of different classification models.

8. The method of claim 6, wherein the ensemble of classifiers comprises bootstrap aggregation.

9. The method of claim 1, wherein the at least one obfuscation threshold value is automatically determined based on training the obfuscation machine learning model with a ground-truth dataset.

10. The method of claim 1, further comprising logging, by the at least one processor, the software programming script in an obfuscation log comprising a list of entries of obfuscated scripts.

11. A system comprising:
at least one processor in communication with at least one non-transitory computer-readable medium having software instructions stored thereon, wherein, upon execution of the software instructions, the at least one processor is configured to:
receive a plurality of software programming scripts;
wherein each software programming script of the plurality of software programming scripts comprise script text;
determine a similarity between the script text of each software programming script and an analyzed script text of each analyzed software programming script in a set of analyzed software programming scripts based on a line-by-line comparison;
determine at least one of the plurality of software programming scripts is a new software programming script based on the similarity with each analyzed software programming script being less than a threshold script similarity;
extract at least one symbol feature from the script text of each new software programming script of the new software programming scripts by recognizing symbols of a symbol set;
utilize an obfuscation machine learning model comprising a classifier to produce a binary obfuscation classification for the new software programming script;
wherein the binary obfuscation classification comprises at least one predicted likelihood of obfuscation relative to at least one obfuscation threshold value; and
causing to display, by the at least one processor, an alert indicting obfuscated software programming scripts of the new software programming script on a screen of at least one computing device associated with at least one administrative user to recommend security analysis of the software programming script based at least in part on the binary obfuscation classification for the new software programming script.

12. The system of claim 11, wherein, upon execution of the software instructions, the at least one processor is further configured to:
determine an average frequency of symbols of the symbol set;
determine a normal score of each symbol of the symbol set based at least in part on the frequency of each symbol and the average frequency;
determine the at least one symbol feature as the normal score of each symbol of the symbol set.

13. The system of claim 11, wherein, upon execution of the software instructions, the at least one processor is further configured to:
receive the plurality of software programming scripts as a stream into a buffer.

14. The system of claim 13, wherein the buffer comprises a first-in, first-out (FIFO) buffer.

15. The system of claim 11, wherein the obfuscation machine learning model comprises an ensemble model of classifiers.

16. The system of claim 15, wherein, upon execution of the software instructions, the at least one processor is further configured to:
determine for each new software programming script of the new software programming scripts, a predicted likelihood obfuscation of the at least one predicted likelihood of obfuscation by each classifier of the ensemble of classifiers based at least in part on the at least one symbol feature;
determine an obfuscation prediction for each classifier of the ensemble of classifiers by comparing each predicted likelihood of obfuscation with the at least one obfuscation threshold value;
determine a quantity of obfuscation votes representative of a number of obfuscation predictions predicting that the software programming script is obfuscated;
determine a quantity of non-obfuscation votes representative of a number of obfuscation predictions predicting that the software programming script is not obfuscated; and
determine the binary obfuscation classification for each new software programming script of the new software programming scripts based on a greater one of the quantity of obfuscation votes and the quantity of non-obfuscation votes.

17. The system of claim 16, wherein the ensemble of classifiers comprises a plurality of different classification models.

18. The system of claim 16, wherein the ensemble of classifiers comprises bootstrap aggregation.

19. The system of claim 11, wherein the at least one obfuscation threshold value is automatically determined based on training the obfuscation machine learning model with a ground-truth dataset.

20. The system of claim 11, further comprising log the software programming script in an obfuscation log comprising a list of entries of obfuscated scripts.

* * * * *